UNITED STATES PATENT OFFICE.

GEORGE G. TURNER, OF NEW YORK, AND CLINTON H. LEIGHTON, OF BROOKLYN, NEW YORK.

PROCESS FOR THE EXTRACTION OF COCOANUT-OILS.

1,247,597.

Specification of Letters Patent. Patented Nov. 20, 1917.

No Drawing. Application filed April 21, 1917. Serial No. 163,691.

*To all whom it may concern:*

Be it known that we, GEORGE G. TURNER and CLINTON H. LEIGHTON, citizens of the United States, residing at New York and Brooklyn, respectively, in the county of New York and Kings, respectively, and State of New York, have invented new and useful Improvements in Processes for the Extraction of Cocoanut-Oils, of which the following is a specification.

The present invention has for its object the recovery in a substantially quantitative manner of cocoanut oil from cocoanut meats, which may be in a fresh or dried state, or in the condition ordinarily known as copra, in which the cocoanut meats have been treated and usually some fermentation processes have set in, and the condition of the material will depend largely upon how far these fermentation processes have advanced, as well as the nature of the said fermentations, nature and amount of impurities such as dirt, molds and the like.

Heretofore cocoanut oil has been produced from cocoanut meat or copra, in commercial practice, principally by expressing the oil under heavy pressure, although extraction by volatile solvents has been proposed, but we are not aware that this method has given satisfactory results in commercial operation.

The process forming the subject matter of our present invention is preferably composed of the following series of steps.

*a.* Comminuting,

*b.* Treatment with salt water,

*c.* Sedimentation (optional),

*d.* Centrifugal separation, and

*e.* Clarification and purification.

The cocoanut meat or copra is first comminuted, for example by running the same through a grating mill, in which it is ground up or crushed up and reduced to about the condition of coarse sawdust. In place of the grating mill for this purpose, we may employ a mill in which the material is operated upon by suitable rollers or choppers, knives or the like.

The material is then placed in a solution of common salt, having a strength of not less than about 3%, and a solution of considerably greater strength, for example about 5 or 6% strength may be employed to advantage, if so desired, particularly if the meat is already considerably fermented or moldy. The material is agitated with the salt water, while in a heated condition, for example at a temperature of about 95 to 100° C., until the oil has substantially all been liberated from the cocoanut meat. If desired this operation may be carried out at somewhat higher temperatures under super-atmospheric pressure, in which case the action will be much more rapid.

The mass may then be allowed to settle more or less, in order for the heavier part of the non-oily matter to settle, in order that this may be easily removed from the supernatent liquid carrying the oily layer.

The upper portion of the liquid, containing water and liquid cocoanut oil is then passed, preferably while at a temperature near the boiling point, through a centrifugal liquid separator, for example of the cream separator type, and the oil thereby separated from the water and particles of solid material carried by the water.

The oil is finally clarified and purified by any suitable or desired method, and we do not limit ourselves to any particular method of clarifying the oil.

What we claim is:

1. A process of obtaining cocoanut oil from copra and like material which comprises (*a*) comminuting the same, (*b*) soaking in hot salt water having a salt content of not less than about 3%, until the said oil is entirely released from the non-oily material, while agitating said material with the water, (*c*) allowing sedimentation, (*d*) passing the oil with a part at least of the other material through a centrifugal specific gravity separator, and (*e*) finally clarifying the oil.

2. In the production of cocoanut oil from cocoanut meat, the steps of digesting the said meat with a solution containing not less than about 3% of sodium chlorid, to release substantially the entire amount of the oil contained therein, and subsequently separating the liberated oil from at least the major part of the remaining material.

In testimony whereof we affix our signatures.

GEORGE G. TURNER.
CLINTON H. LEIGHTON.